(12) United States Patent
Jung et al.

(10) Patent No.: US 11,970,578 B2
(45) Date of Patent: Apr. 30, 2024

(54) POLYIMIDE PRECURSOR, POLYIMIDE PRECURSOR COMPOSITION, POLYIMIDE FILM, MANUFACTURING METHOD THEREOF, AND USE THEREOF

(71) Applicants: SK Innovation Co., Ltd., Seoul (KR); SK ie technology Co., Ltd., Seoul (KR)

(72) Inventors: Min Seon Jung, Daejeon (KR); Hyo Shin Kwak, Daejeon (KR); Joo Hyun Lee, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 435 days.

(21) Appl. No.: 17/412,755

(22) Filed: Aug. 26, 2021

(65) Prior Publication Data
US 2022/0073681 A1 Mar. 10, 2022

(30) Foreign Application Priority Data
Sep. 4, 2020 (KR) .................. 10-2020-0113020

(51) Int. Cl.
*C08G 73/10* (2006.01)
*C08J 5/18* (2006.01)

(52) U.S. Cl.
CPC ............ *C08G 73/1085* (2013.01); *C08J 5/18* (2013.01); *C08J 2379/08* (2013.01)

(58) Field of Classification Search
CPC ............... C08G 73/10; C08G 73/1039; C08G 73/1078; C08L 79/08
See application file for complete search history.

(56) References Cited

U.S. PATENT DOCUMENTS 7,045,539 B2 5/2006 Barlaam et al.
2011/0081428 A1 4/2011 Lithgow et al.

FOREIGN PATENT DOCUMENTS

| CN | 103101282 | * | 5/2013 |
| CN | 110204719 | A | 9/2019 |
| CN | 110776657 | A | 2/2020 |
| CN | 111019345 | A | 4/2020 |
| JP | 2004524289 | A | 8/2004 |
| KR | 1020100039792 | A | 4/2010 |

OTHER PUBLICATIONS

II. Zhuang et al Effect of Isomerism on Molecular Packing and Gas Transport Properties of Poly(benzoxazole-co-imide)s, Macromolecules 2014, 47, 7947-7957, published on Nov. 11, 2014.*
Choi et al., "Soluble polyimides from unsymmetrical diamine containing benzimidazole ring and trifluromethyl pendent group", 2008, pp. 2644-2649, vol. 49.

* cited by examiner

*Primary Examiner* — Gregory Listvoyb
(74) *Attorney, Agent, or Firm* — The Webb Law Firm

(57) ABSTRACT

The present invention relates to a polyimide precursor, a polyimide precursor solution, a polyimide film, a manufacturing method thereof, and a use thereof. The polyimide precursor according to the present invention may provide a polyimide film that has excellent heat resistance and satisfies transparency and a low coefficient of linear thermal expansion, and thus the polyimide film will be usefully applicable in the field of flexible displays requiring high dimensional stability.

17 Claims, No Drawings

POLYIMIDE PRECURSOR, POLYIMIDE PRECURSOR COMPOSITION, POLYIMIDE FILM, MANUFACTURING METHOD THEREOF, AND USE THEREOF

CROSS-REFERENCE TO RELATED APPLICATION

This application claims priority to Korean Patent Application No. 10-2020-0113020 filed Sep. 4, 2020, the disclosure of which is hereby incorporated by reference in its entirety.

BACKGROUND OF THE INVENTION

Field of the Invention

The following disclosure relates to a polyimide precursor, a polyimide precursor solution, a polyimide film, a manufacturing method thereof, and a use thereof

Description of Related Art

Polyimide has been considered as a light and flexible material with high heat resistance. As a resin having excellent thermal dimensional stability in a field of such a polyimide, aromatic polyimides have been prominent. A polyimide film, which is a molded product made of the aromatic polyimides with a rigid and linear chemical structure, has been widely used in fields requiring high thermal dimensional stability (low coefficient of linear thermal expansion), such as a base film for a flexible substrate and an interlayer insulating film for a semiconductor. However, aromatic polyimides having a low coefficient of linear thermal expansion are strongly colored by intramolecular conjugation and intramolecular-intermolecular charge transfer interactions, and thus, are difficult to apply in optical applications. In addition, the polyimide has very strong intermolecular forces, and thus, lacks processability.

Meanwhile, a flexible device is manufactured by forming a film by applying a polyimide precursor composition on a transfer substrate and curing the composition, completing the device through a subsequent process such as a thin-film transistor (TFT) and organic film deposition, and then detaching the finished device from the transfer substrate. As described above, the flexible device accompanying a high-temperature process is required to have heat resistance at a high temperature. In particular, when a thin-film transistor process using low temperature polysilicon (LTPS) is used, a process temperature may approach 500° C. Therefore, the polyimide film formed on the transfer substrate is not subject to thermal decomposition by hydrolysis even during a high-temperature process and should satisfy high heat resistance. In addition, transparency after processing as well as storage stability also need to be ensured.

Therefore, for the manufacture of the flexible device, it is necessary to develop of a new polyimide capable of satisfying high heat resistance and preventing hydrolysis to exhibit excellent chemical resistance and storage stability, and improving optical and mechanical properties.

SUMMARY OF THE INVENTION

An embodiment of the present invention is directed to provides a polyimide precursor and a polyimide precursor solution, for providing a polyimide film having excellent heat resistance and significantly improved physical properties such as transparency, a yellow index, and a Young's modulus.

Another embodiment of the present invention provides a polyimide film using the polyimide precursor solution and a manufacturing method thereof.

Still another embodiment of the present invention may provide a multilayer structure and a photoelectric element that include the polyimide film.

In one general aspect, there is provided a polyimide precursor including a structural unit derived from a diamine compound represented by the following Formula 1 and a structural unit derived from an acid dianhydride:

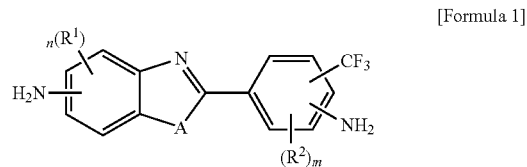

[Formula 1]

wherein
A is O or S;
$R^1$ and $R^2$ are each independently halogen, $(C_1-C_{10})$alkyl, halo$(C_1-C_{10})$alkyl, $(C_1-C_{10})$alkoxy, or $(C_6-C_{12})$ aryl; and
m and n are each independently an integer of 0 to 3.

In Formula 1, $R^1$ and $R^2$ may be each independently halogen, $(C_1-C_{10})$alkyl or halo$(C_1-C_{10})$alkyl; and n and m may be each independently an integer of 0 to 1.

The Formula 1 may be represented by the following Formula 2:

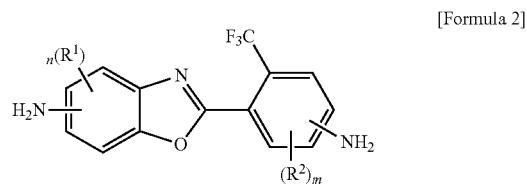

[Formula 2]

wherein
$R^1$ and $R^2$ are each independently halogen, $(C_1-C_{10})$alkyl, halo$(C_1-C_{10})$alkyl, $(C_1-C_{10})$alkoxy, or $(C_6-C_{12})$ aryl; and
m and n are each independently an integer of 0 to 3.
$R^1$ and $R^2$ may be each independently halogen, $(C_1-C_5)$ alkyl, or halo$(C_1-C_5)$alkyl; and n and m may be each independently an integer of 0 to 1.

The acid dianhydride compound may be represented by the following Formula 3:

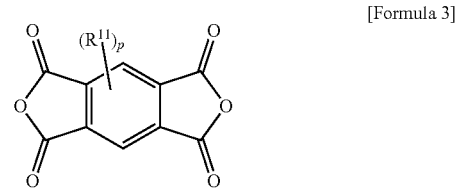

[Formula 3]

wherein
$R^{11}$ is $(C_1-C_{10})$alkyl or halo$(C_1-C_{10})$alkyl; and
p is an integer of 0 to 2.

The polyimide precursor may further include a structural unit derived from a diamine compound represented by the following Formula 4:

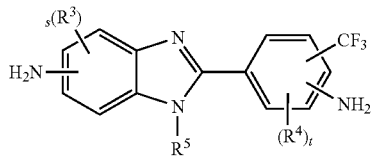

[Formula 4]

wherein
$R^3$ and $R^4$ are each independently halogen, $(C_1$-$C_{10})$alkyl, halo$(C_1$-$C_{10})$alkyl, $(C_1$-$C_{10})$alkoxy, or $(C_6$-$C_{12})$ aryl;
$R^5$ is hydrogen, $(C_1$-$C_{10})$alkyl, halo$(C_1$-$C_{10})$alkyl, $(C_1$-$C_{10})$alkoxy, or $(C_6$-$C_{12})$ aryl; and
s and t are integers of 0 to 3.

In detail, the polyimide precursor may include a repeating unit represented by the following Formula 11:

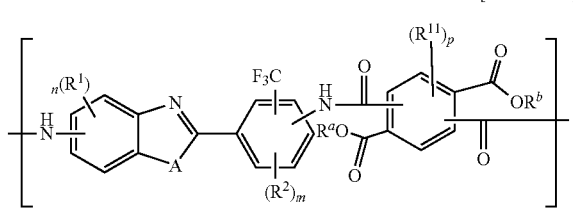

[Formula 11]

wherein
A is O or S;
$R^1$ and $R^2$ are each independently halogen, $(C_1$-$C_{10})$alkyl, halo$(C_1$-$C_{10})$alkyl, $(C_1$-$C_{10})$alkoxy, or $(C_6$-$C_{12})$ aryl;
$R^{11}$ is $(C_1$-$C_{10})$alkyl or halo$(C_1$-$C_{10})$alkyl; and
$R^a$ and $R^b$ are each independently hydrogen or $(C_1$-$C_{10})$ alkyl;
m and n are each independently an integer of 0 to 3; and
p is an integer of 0 to 2.

In detail, the polyimide precursor may include 10 to 100 mol % of a repeating unit represented by Formula 11 above.

In another general aspect, there is provided a polyimide precursor solution including the polyimide precursor and a solvent.

The solvent may be amides, and the amides may be N,N-diethylacetamide, N,N-diethylformamide, N-ethylpyrrolidone, N,N-dimethylpropionamide, N,N-diethylpropionamide, or a mixture thereof.

In another general aspect, there is provided a polyimide film including a repeating unit represented by the following Formula 12:

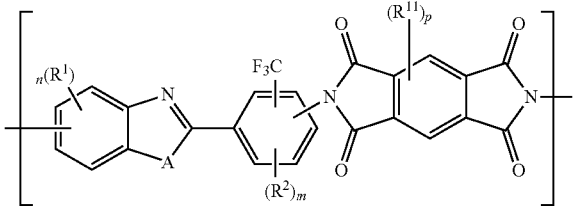

[Formula 12]

wherein
A is O or S;
$R^1$ and $R^2$ are each independently halogen, $(C_1$-$C_{10})$alkyl, halo$(C_1$-$C_{10})$alkyl, $(C_1$-$C_{10})$alkoxy, or $(C_6$-$C_{12})$ aryl;
$R^{11}$ is $(C_1$-$C_{10})$alkyl or halo$(C_1$-$C_{10})$alkyl;
m and n are each independently an integer of 0 to 2; and
p is an integer of 0 to 2.

The polyimide film may further include a repeating unit represented by the following Formula 13:

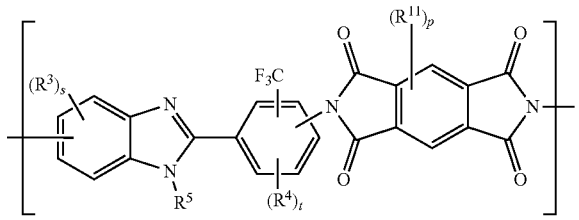

[Formula 13]

wherein
$R^3$ and $R^4$ are each independently halogen, $(C_1$-$C_{10})$alkyl, halo$(C_1$-$C_{10})$alkyl, $(C_1$-$C_{10})$alkoxy, or $(C_6$-$C_{12})$ aryl;
$R^5$ is hydrogen, $(C_1$-$C_{10})$alkyl, halo$(C_1$-$C_{10})$alkyl, $(C_1$-$C_{10})$alkoxy, or $(C_6$-$C_{12})$ aryl;
$R^{11}$ is $(C_1$-$C_{10})$alkyl or halo$(C_1$-$C_{10})$alkyl;
s and t are integers of 0 to 3; and
p is an integer of 0 to 2.

The polyimide film may have a coefficient of thermal expansion (CTE) of more than 0 to 20 ppm/° C. or less at 100 to 450° C., for example, a yellow index (YI) of less than 25 as measured according to ASTM E313, and a Young's modulus of more than 7.0 as measured according to ASTM D882.

The polyimide film may be used for a substrate for an element, a substrate for a display, an optical film, an integrated circuit (IC) package, an adhesive film, a multilayer flexible printed circuit (FPC), a tape, a touch panel, or a protective film for an optical disk.

In another general aspect, there are provided a multilayer film and a photoelectric element that include the polyimide film.

In another general aspect, there is provided a manufacturing method of a polyimide film, including: applying the polyimide precursor solution to a substrate and then performing heat treatment.

In the manufacturing method of a polyimide film, the heat treatment may include:
a first heat treatment step performed at a temperature of 100° C. or less;
a second heat treatment step performed at a temperature of more than 100° C. and 300° C. or less; and
a third heat treatment step performed at a temperature of more than 300° C. and 500° C. or less.

The polyimide precursor solution may contain 10 to 13% by weight of solids based on the total weight.

DESCRIPTION OF THE INVENTION

All technical terms and scientific terms have the same meanings as those commonly understood by a person skilled in the art to which the present invention pertains unless otherwise defined. The terms used in the description of the present invention are only for effectively describing certain embodiments, and are not intended to limit the present invention.

Singular forms used in the specification are intended to include the plural forms as well unless otherwise indicated in context.

In addition, units used herein are based on weight, unless otherwise specified. For example, the unit of % or ratio means % by weight or ratio by weight, and % by weight means % by weight of any one component in the total composition, unless otherwise defined.

In addition, numerical ranges used herein include a lower limit, an upper limit, and all values within that range, increments that are logically derived from the type and width of the defined range, all double-defined values, and all possible combinations of upper and lower limits of numerical ranges defined in different forms. Unless otherwise defined herein, values outside the numerical range that may arise due to experimental errors or rounded values are also included in the defined numerical range.

As used herein, the term "comprise" is an "open" description having the meaning equivalent to expressions such as "include," "contain," "have," or "feature", and does not exclude elements, materials, or process that are not further listed.

As used herein, the term "polyimide precursor solution" refers to a composition for preparing polyimide, and specifically, the polyimide precursor may have an equivalent meaning to polyamic acid. In addition, the polyimide precursor solution may also be used as a composition for preparing polyamideimide.

As used herein, the term "polyimide film" is a molded product of polyimide derived from a polyimide precursor solution, and may have an equivalent meaning to polyimide.

As used herein, the term "halogen" refers to a fluorine (F), chlorine (Cl), bromine (Br), or iodine (I) atom.

As used herein, the term "alkyl" is an organic radical derived from an aliphatic hydrocarbon by the removal of one hydrogen, and includes both straight and branched chain forms.

As used herein, the term "alkoxy" is represented by *—O-alkyl, and the alkyl is as defined above.

As used herein, the term "haloalkyl" means that one hydrogen in the alkyl is replaced by a halogen.

As used herein, the term "aryl" refers to an organic radical derived from aromatic hydrocarbon by the removal of one hydrogen, includes a monocyclic or fused ring system containing suitably 4 to 7, specifically 5 or 6 ring atoms in each ring, and even a form in which a plurality of aryls are connected by a single bond. Examples of aryl include, but are not limited to, phenyl, naphthyl, biphenyl, terphenyl, etc.

The polyimide precursor according to an exemplary embodiment includes a structural unit derived from a novel diamine compound having a specific structure and a structural unit derived from an acid dianhydride compound.

The novel diamine compound is represented by the following Formula 1:

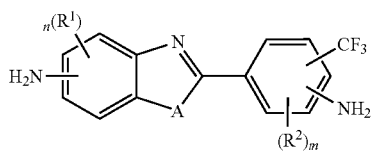

[Formula 1]

wherein

A is O or S;

$R^1$ and $R^2$ are each independently halogen, $(C_1\text{-}C_{10})$alkyl, halo$(C_1\text{-}C_{10})$alkyl, $(C_1\text{-}C_{10})$alkoxy, or $(C_6\text{-}C_{12})$ aryl; and m and n are each independently an integer of 0 to 3.

The polyimide precursor may have linearity and rigidity by using a diamine compound containing a benzothiazolyl group or a benzoxazolyl group as a polyimide monomer, and thus, may impart surprisingly improved optical and mechanical properties such as high heat resistance, chemical resistance, transparency, etc., having an excellent coefficient of thermal expansion to the polyimide film.

In an aspect of manufacturing a polyimide film having more excellent optical and mechanical properties, in Formula 1, $R^1$ and $R^2$ may be each independently halogen, $(C_1\text{-}C_{10})$alkyl or halo$(C_1\text{-}C_{10})$alkyl; and n and m may be each independently an integer of 0 to 1.

In an exemplary embodiment of the present invention, in Formula 1, $R^1$ and $R^2$ may be each independently halogen, $(C_1\text{-}C_5)$alkyl, or halo$(C_1\text{-}C_5)$alkyl; and n and m may be each independently an integer of 0 to 1.

In an exemplary embodiment of the present invention, in Formula 1 may be represented by the following Formula 1-1:

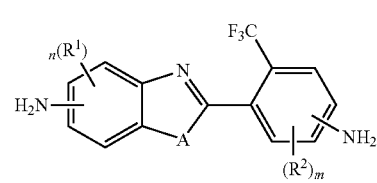

[Formula 1-1]

wherein

A is O or S;

$R^1$ and $R^2$ are each independently halogen, $(C_1\text{-}C_{10})$alkyl, halo$(C_1\text{-}C_{10})$alkyl, $(C_1\text{-}C_{10})$alkoxy, or $(C_6\text{-}C_{12})$ aryl; and m and n are each independently an integer of 0 to 3.

For example, in Formula 1-1, A is O or S; $R^1$ and $R^2$ may be each independently halogen, $(C_1\text{-}C_5)$alkyl, halo$(C_1\text{-}C_5)$alkyl, $(C_1\text{-}C_5)$alkoxy or $(C_6\text{-}C_{12})$ aryl; m and n may be each independently an integer of 0 to 1, specifically, A may be O or S; $R^1$ and $R^2$ may be each independently halogen, $(C_1\text{-}C_5)$alkyl or halo$(C_1\text{-}C_5)$alkyl; m and n may be each independently an integer of 0 to 1, and more specifically, A may be O; $R^1$ and $R^2$ may be each independently halogen, $(C_1\text{-}C_5)$alkyl, halo$(C_1\text{-}C_5)$alkyl, $(C_1\text{-}C_5)$alkoxy, or $(C_6\text{-}C_{12})$ aryl; and m and n may be 0.

In an exemplary embodiment of the present invention, the novel diamine compound includes a benzothiazolyl group or a benzoxazolyl group as described above and at the same time has a specific substituent $CF_3$ at a specific site, such that a polyimide film having more improved physical properties, particularly higher transparency, may be manufactured.

In an exemplary embodiment of the present invention, Formula 1 may be represented by the following Formula 2:

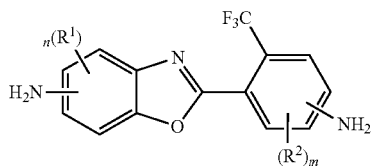

[Formula 2]

wherein

R[1] and R[2] are each independently halogen, $(C_1-C_{10})$alkyl, halo$(C_1-C_{10})$alkyl, $(C_1-C_{10})$alkoxy, or $(C_6-C_{12})$ aryl; and m and n are each independently an integer of 0 to 3.

In an exemplary embodiment of the present invention, the diamine compound represented by Formula 2 is a compound in which benzoxazole having an amino group, and benzene having CF$_3$, which is a specific substituent introduced at a specific position, and an amino group, are connected by a single bond. By including a structural unit derived from the diamine compound represented by Formula 2 above, such that a polyimide film having an excellent coefficient of thermal expansion and excellent transparency due to low yellowness may be implemented.

In Formula 2 according to an exemplary embodiment of the present invention, R[1] and R[2] may be each independently halogen, $(C_1-C_5)$alkyl or halo$(C_1-C_5)$alkyl; n and m may be each independently as integer of 0 to 1, specifically R[1] and R[2] may be each independently halogen, $(C_1-C_5)$alkyl or halo$(C_1-C_5)$alkyl; and n and m may be 0.

Specifically, in an exemplary embodiment of the present invention, the diamine compound may be selected from the following compounds, but is not limited thereto.

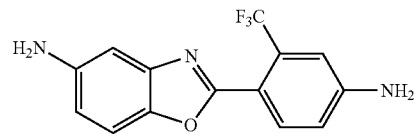

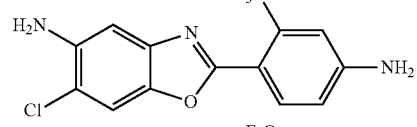

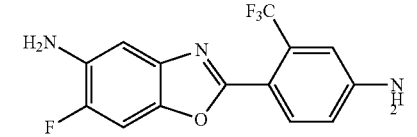

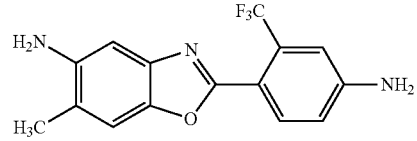

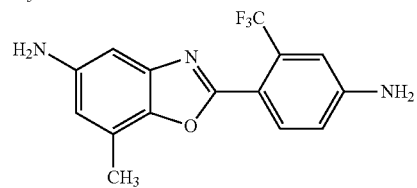

-continued

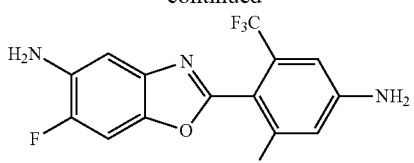

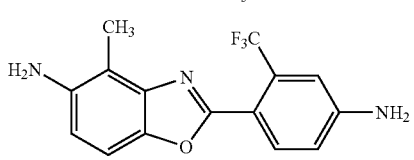

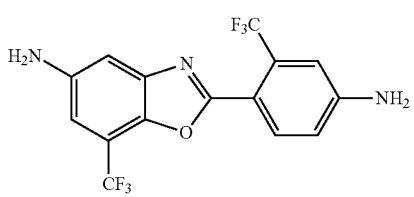

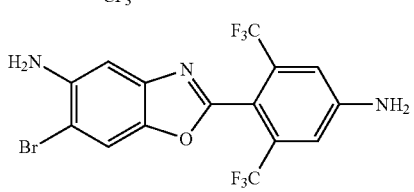

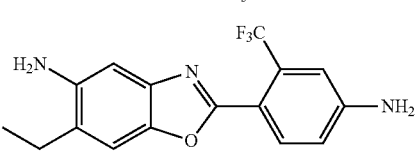

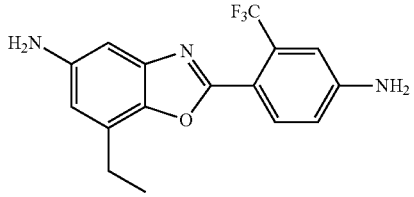

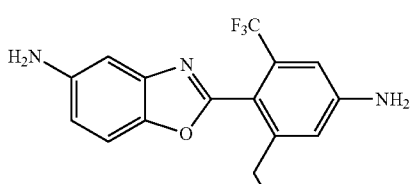

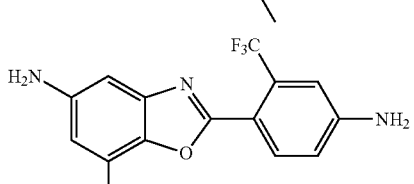

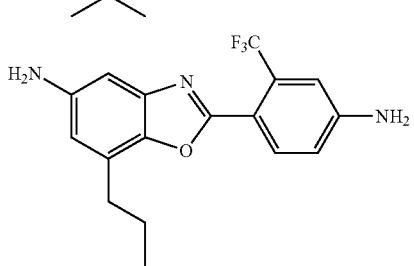

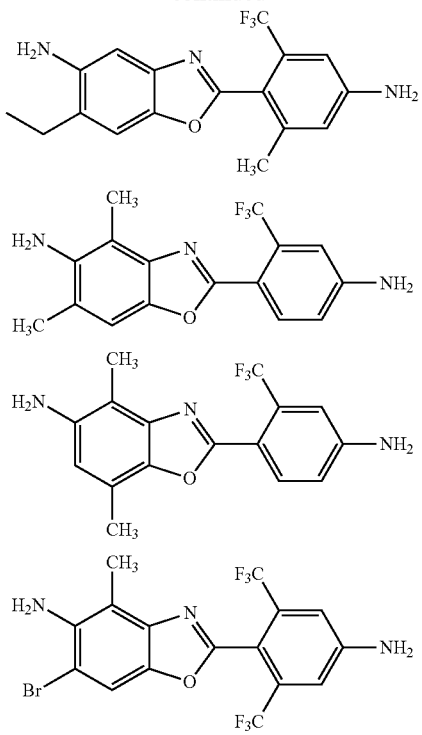

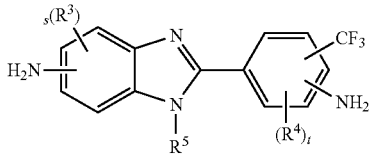

wherein

R³ and R⁴ are each independently halogen, $(C_1-C_{10})$alkyl, halo$(C_1-C_{10})$alkyl, $(C_1-C_{10})$alkoxy, or $(C_6-C_{12})$ aryl;

R⁵ is hydrogen, $(C_1-C_{10})$alkyl, halo$(C_1-C_{10})$alkyl, $(C_1-C_{10})$alkoxy, or $(C_6-C_{12})$ aryl; and s and t are integers of 0 to 3.

The polyimide precursor according to an exemplary embodiment of the present invention further includes a structural unit derived from the diamine compound represented by Formula 4 above, such that a polyimide film having more excellent optical and mechanical properties may be prepared, and a polyimide film having more controlled properties may be implemented.

In Formula 4 according to an exemplary embodiment of the present invention, R³ and R⁴ may be each independently halogen, $(C_1-C_{10})$alkyl, or halo$(C_1-C_{10})$alkyl; R⁵ may be hydrogen or $(C_1-C_{10})$alkyl, s and t may be integers of 0 to 1, specifically, R³ and R⁴ may be each independently halogen, $(C_1-C_5)$alkyl or halo$(C_1-C_5)$alkyl; R⁵ may be hydrogen or $(C_1-C_5)$alkyl, s and t may be integers of 0 to 1, and more specifically, s and t may be 0.

The polyimide precursor according to an exemplary embodiment of the present invention may further include a structural unit derived from a diamine compound represented by the following Formula 5:

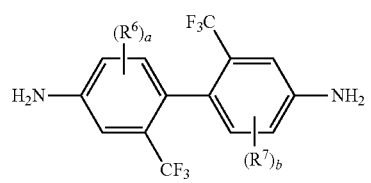

wherein

R⁶ and R⁷ are each independently halogen, $(C_1-C_{10})$alkyl, halo$(C_1-C_{10})$alkyl, $(C_1-C_{10})$alkoxy, or $(C_6-C_{12})$ aryl; and a and b are each independently an integer of 0 to 3.

For example, in Formula 5, R⁶ and R⁷ are each independently halogen, $(C_1-C_{10})$alkyl, or halo$(C_1-C_{10})$alkyl; a and b may be each independently an integer of 0 to 1, and more specifically, a and b may be 0.

For example, in Formula 3 above, R¹¹ may be $(C_1-C_5)$alkyl or halo$(C_1-C_5)$alkyl; p may be an integer of 0 to 1, and more specifically R¹¹ may be $(C_1-C_5)$alkyl or halo$(C_1-C_5)$alkyl; and p may be 0.

The polyimide precursor according to an exemplary embodiment of the present invention may further include a structural unit derived from a diamine compound in addition to the structural unit derived from the diamine compound represented by Formula 1 above. Examples of the further included diamine compound may include, but are not limited to, 4,4'-diaminodiphenylpropane, 4,4'-diaminodiphenylmethane, 4,4'-diaminodiphenylsulfide, 3,3'-diaminodiphenylsulfone, 4,4'-diaminodiphenylsulfone, 4,4'-oxydianiline, 3,3'-oxydianiline, 3,4'-oxydianiline, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene (p-phenylenediamine), bis{4-(4-aminophenoxy)phenyl}sulfone, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 1,3-bis(4-aminophenoxy)benzene, 1,3-bis(3-aminophenoxy)benzene, 3,3'-diaminobenzophenone, 4,4'-diaminobenzophenone, 2,2-bis(4-aminophenoxyphenyl)propane, or the like, or combinations thereof.

The polyimide precursor according to an exemplary embodiment of the present invention may further include a structural unit derived from a diamine compound represented by the following Formula 4:

In an exemplary embodiment of the present invention, the acid dianhydride may be any compound having an acid dianhydride functional group, and specifically, may be tetracarboxylic dianhydride. The tetracarboxylic dianhydride may be a compound selected from $(C_5-C_{36})$ aromatic tetracarboxylic dianhydride, $(C_6-C_{36})$ aliphatic tetracarboxylic dianhydride, and $(C_6-C_{36})$ alicyclic tetracarboxylic dianhydride. The tetracarboxylic dianhydride may specifically be $(C_8-C_{36})$ aromatic tetracarboxylic dianhydride in terms of having an excellent yellow index even in a high temperature region. The number of carbons in tetracarboxylic dianhydride according to an exemplary embodiment of the present invention also includes the number of carbons included in the carboxyl group. For example, specific examples of tetracarboxylic dianhydride according to an exemplary embodiment of the present invention may include 4,4'-(hexafluoroisopropylidene)diphthalic anhydride, 5-(2,5-dioxotetrahydro-3-furanyl)-3-methyl-cyclohexene-1,2 dicarboxylic acid anhydride, pyromellitic dianhydride, 1,2,3,4-benzenetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 3,3',4,4'-diphenylsulfonetetracarboxylic dianhydride, 2,2',3,3'-biphenyltetracarboxylic dianhydride, methylene-4,4'-diphthalic dianhydride, 1,1-ethylidene-4,4'-diphthalic dianhydride, 2,2-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 4,4'-oxydiphthalic dianhydride, p-phenylenebis(trimellitate anhydride), thio-4,4'-diphthalic dianhydride, sulfonyl-4,4'-diphthalic dianhydride, 1,3-bis(3,4-dicarboxyphenyl)benzene dianhydride, 1,3-bis(3,4-dicarboxyphenoxy)benzene dianhydride, 1,4-bis(3,4-dicarboxyphenoxy)benzene dianhydride, 1,3-bis[2-(3,4-dicarboxyphenyl)-2-propyl]benzene dianhydride, 1,4-bis[2-(3,4-dicarboxphenyl)phenyl)-2-propyl]benzene dianhydride, bis[3-(3,4-dicarboxyphenoxy)phenyl]methane dianhydride, bis[4-(3,4-dicarboxyphenoxy)phenyl]methane dianhydride, 2,2-bis[3-(3,4-dicarboxyphenoxy)phenyl]propane dianhydride, 2,2-bis[4-(3,4-dicarboxyphenoxy)phenyl]propane dianhydride, bis(3,4-dicarboxyphenoxy)dimethylsilane dianhydride, 1,3-bis(3,4-dicarboxyphenyl)-1,1,3,3-tetramethyldisiloxane dianhydride, 2,3,6,7-naphthalenetetracarboxylic dianhydride, 1,4,5,8-naphthalenetetracarboxylic dianhydride, 1,2,5,6-naphthalene tetracarboxylic dianhydride, 3,4,9,10-perylenetetracarboxylic dianhydride, 2,3,6,7-anthracenetetracarboxylic dianhydride, 1,2,7,8-phenanthrene tetracarboxylic dianhydride, etc. Specifically, examples of the (C6-C50) aliphatic tetracarboxylic dianhydride may include ethylenetetracarboxylic dianhydride, 1,2,3,4-butanetetracarboxylic dianhydride, etc; and examples of the $(C_6-C_{36})$ alicyclic tetracarboxylic dianhydride may include 1,2,3,4-cyclobutanetetracarboxylic dianhydride, cyclopentanetetracarboxylic dianhydride, cyclohexane-1,2,3,4-tetracarboxylic dianhydride, cyclohexane1,2,4,5-tetracarboxylic dianhydride, 3,3',4,4'-bicyclohexyltetracarboxylic dianhydride, carbonyl-4,4'-bis(cyclohexane-1,2-dicarboxylic acid) dianhydride, methylene-4,4'-bis(cyclohexane-1,2-dicarboxylic acid) dianhydride, 1,2-ethylene-4,4'-bis(cyclohexane-1,2-dicarboxylic acid) dianhydride, 1,1-ethylidene-4,4'-bis(cyclohexane-1,2-dicarboxylic acid) dianhydride, 2,2-propylene-4,4'-bis(cyclohexane-1,2-dicarboxylic acid) dianhydride, oxy 4,4'-bis(cyclohexane-1,2-dicarboxylic acid) dianhydride, thio-4,4'-bis(cyclohexane-1,2-dicarboxylic acid) dianhydride, sulfonyl-4,4'-bis(cyclohexane-1,2-dicarboxylic acid) dianhydride, bicyclo[2,2,2]oct-7-ene-2,3,5,6-tetracarboxylic dianhydride, 4-(2,5-dioxotetrahydrofuran-3-yl)-1,2,3,4-tetrahydronaphthalene-1,2-dicarboxylic anhydride, ethylene glycol-bis-(3,4-dicarboxylic acid anhydride phenyl)ether, etc.

For example, the acid dianhydride according to an exemplary embodiment of the present invention may be an acid dianhydride represented by the following Formula 3, and may include a structural unit derived from the acid dianhydride represented by Formula 3 above to implement more excellent chemical resistance and yellow index.

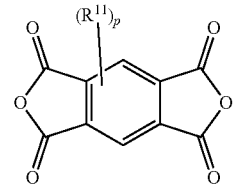

[Formula 3]

wherein
$R^{11}$ is $(C_1-C_{10})$alkyl or halo$(C_1-C_{10})$alkyl; and
p is an integer of 0 to 2.

In Formula 3 according to an exemplary embodiment of the present invention, $R^{11}$ may be $(C_1-C_5)$alkyl or halo$(C_1-C_5)$alkyl; p may be an integer of 0 to 1, and more specifically $R^{11}$ may be $(C_1-C_5)$alkyl or halo$(C_1-C_5)$alkyl; and p may be 0.

The polyimide precursor according to an exemplary embodiment of the present invention may further include a structural unit derived from an acid dianhydride represented by the following Formula 3-1:

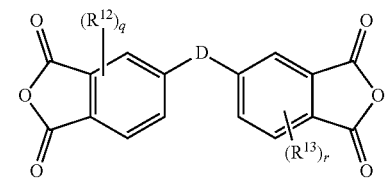

[Formula 3-1]

wherein
D is $(C_1-C_{10})$alkylene unsubstituted or substituted with halo$(C_1-C_{10})$alkyl;
$R^{12}$ and $R^{13}$ are each independently $(C_1-C_{10})$alkyl or halo$(C_1-C_{10})$alkyl; and
q and r are each independently an integer of 0 to 2.

For example, in Formula 3-1 above, D may be $(C_1-C_5)$ alkylene unsubstituted or substituted with halo$(C_1-C_5)$alkyl; $R^{12}$ and $R^{13}$ may be each independently $(C_1-C_5)$alkyl; q and r may be each independently an integer of 0 to 1, specifically, D may be $(C_1-C_3)$alkylene unsubstituted or substituted with halo$(C_1-C_3)$alkyl; $R^{12}$ and $R^{13}$ may be each independently $(C_1-C_3)$alkyl; q and r may be each independently an integer of 0 to 1, and more specifically, D may be $(C_1-C_3)$ alkylene unsubstituted or substituted with halo$(C_1-C_3)$alkyl; $R^{12}$ and $R^{13}$ may be each independently $(C_1-C_3)$alkyl; and q and r may be 0.

The polyimide precursor according to an exemplary embodiment of the present invention may include a repeating unit represented by the following Formula 11:

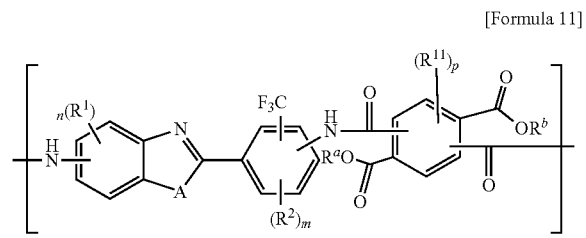

[Formula 11]

wherein

A is O or S;

$R^1$ and $R^2$ are each independently halogen, $(C_1-C_{10})$alkyl, halo$(C_1-C_{10})$alkyl, $(C_1-C_{10})$alkoxy, or $(C_6-C_{12})$ aryl;

$R^{11}$ is $(C_1-C_{10})$alkyl or halo$(C_1-C_{10})$alkyl; and $R^a$ and $R^b$ are each independently hydrogen or $(C_1-C_{10})$alkyl;

m and n are each independently an integer of 0 to 3; and p is an integer of 0 to 2.

For example, in Formula 11 above, A may be O; $R^1$ and $R^2$ may be each independently halogen, $(C_1-C_{10})$alkyl, or halo$(C_1-C_{10})$alkyl; $R^{11}$ may be $(C_1-C_{10})$alkyl or halo$(C_1-C_{10})$alkyl; $R^a$ and $R^b$ may be each independently hydrogen or $(C_1-C_{10})$alkyl; m and n may be each independently an integer of 0 to 1; p may be an integer of 0 to 1, specifically, A may be O; $R^1$ and $R^2$ may be each independently halogen, $(C_1-C_5)$alkyl or halo$(C_1-C_5)$alkyl; $R^{11}$ is $(C_1-C_5)$alkyl or halo$(C_1-C_5)$alkyl; $R^a$ and $R^b$ may be each independently hydrogen or $(C_1-C_5)$alkyl; m and n may be each independently an integer of 0 to 1; p may be an integer of 0 to 1, and more specifically, A may be O; and m, n and p may be 0.

The polyimide precursor according to an exemplary embodiment of the present invention may include 10 to 100 mol % of the repeating unit represented by Formula 11 above, specifically, 30 to 100 mol %, specifically 40 to 95 mol %, and more specifically, 50 to 80 mol %.

The polyimide precursor according to an exemplary embodiment of the present invention may further include a repeating unit represented by the following Formula 11-1:

[Formula 11-1]

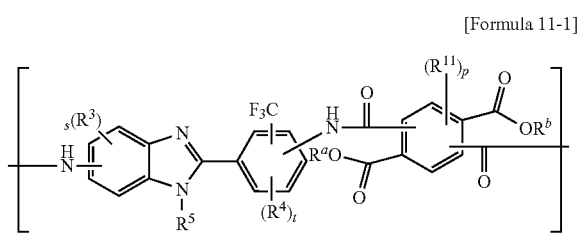

wherein $R^3$ and $R^4$ are each independently halogen, $(C_1-C_{10})$alkyl, halo$(C_1-C_{10})$alkyl, $(C_1-C_{10})$alkoxy, or $(C_6-C_{12})$ aryl;

$R^5$ is hydrogen, $(C_1-C_{10})$alkyl, halo$(C_1-C_{10})$alkyl, $(C_1-C_{10})$alkoxy, or $(C_6-C_{12})$ aryl;

$R^{11}$ is $(C_1-C_{10})$alkyl or halo$(C_1-C_{10})$alkyl;

$R^a$ and $R^b$ are each independently hydrogen or (C1C10) alkyl;

s and t are each independently an integer of 0 to 3; and p is an integer of 0 to 2.

For example, in Formula 11-1 above, $R^3$ and $R^4$ may be each independently halogen, $(C_1-C_{10})$alkyl, or halo$(C_1-C_{10})$alkyl; $R^5$ may be hydrogen, $(C_1-C_{10})$alkyl, or halo$(C_1-C_{10})$alkyl; $R^{11}$ is $(C_1-C_{10})$alkyl or halo$(C_1-C_{10})$alkyl; $R^a$ and $R^b$ may be each independently hydrogen or $(C_1-C_{10})$alkyl; s and t may be each independently an integer of 0 to 3; p may be an integer of 0 to 2, and specifically, $R^3$ and $R^4$ may be each independently halogen, $(C_1-C_5)$alkyl, or halo$(C_1-C_5)$alkyl; $R^5$ may be hydrogen, $(C_1-C_5)$alkyl, or halo$(C_1-C_5)$alkyl; $R^{11}$ may be $(C_1-C_5)$alkyl or halo$(C_1-C_5)$alkyl; $R^a$ and $R^b$ may be each independently hydrogen or $(C_1-C_5)$alkyl; s and t may be each independently an integer of 0 to 1; p may be an integer of 0 to 1, and more specifically, $R^{11}$ may be $(C_1-C_5)$alkyl; $R^a$ and $R^b$ may be each independently hydrogen or $(C_1-C_5)$alkyl; and s, t and p may be 0.

In an exemplary embodiment of the present invention, a repeating unit represented by Formula 11-1 may be included in an amount of 10 to 90 mol % based on the total mol % of the polyimide precursor, specifically 30 to 80 mol %, specifically, 40 to 70 mol %, and specifically, 50 to 60 mol %.

The polyimide precursor according to an exemplary embodiment of the present invention may further include repeating units represented by the following Formulas 11-2 and 11-3:

[Formula 11-2]

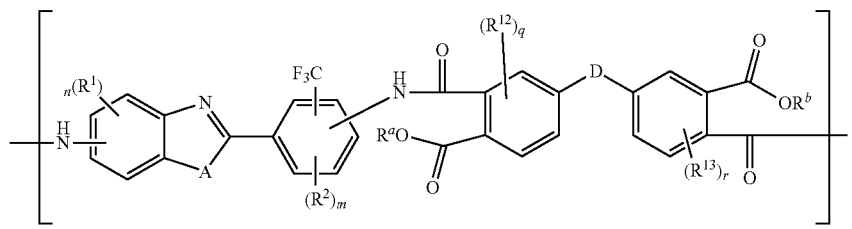

[Formula 11-3]

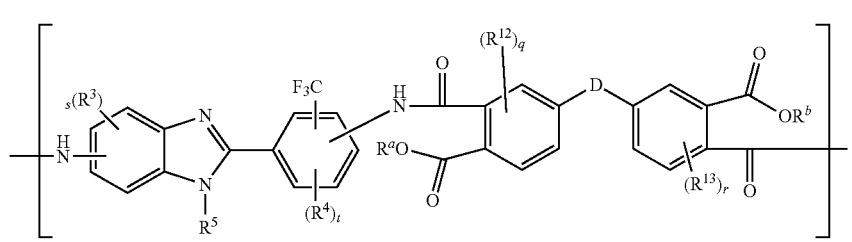

wherein

A is O or S;

D is $(C_1-C_{10})$alkylene unsubstituted or substituted with halo$(C_1-C_{10})$alkyl;

$R^1$ and $R^4$ are each independently halogen, $(C_1-C_{10})$alkyl, halo$(C_1-C_{10})$alkyl, $(C_1-C_{10})$alkoxy, or $(C_6-C_{12})$ aryl;

$R^5$ is hydrogen, $(C_1-C_{10})$alkyl, halo$(C_1-C_{10})$alkyl, $(C_1-C_{10})$alkoxy, or $(C_6-C_{12})$ aryl;

sented by Formula 11 above, and may further include the repeating unit represented by Formula 11-1 above, include the repeating unit represented by Formula 11-2 above, and the repeating unit represented by Formula 11-3 above.

The diamine compound according to a specific exemplary embodiment of the present invention may be prepared as shown in Scheme 1 below, but may be variously modified through conventional organic synthesis methods other than Scheme 1 below.

[Scheme 1]

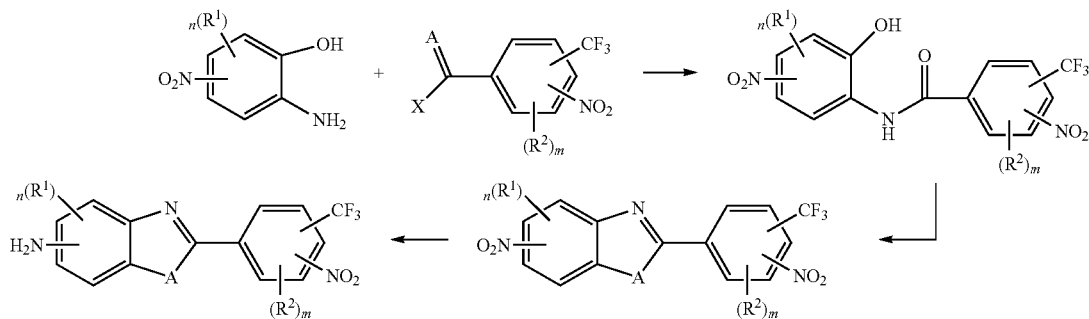

$R^{12}$ and $R^{13}$ are each independently $(C_1-C_{10})$alkyl or halo$(C_1-C_{10})$alkyl;

$R^a$ and $R^b$ are each independently hydrogen or (C1C10) alkyl;

m and n are each independently an integer of 0 to 3;

q and r are each independently an integer of 0 to 2; and s and t are each independently an integer of 0 to 3.

For example, in Formulas 11-2 and 11-3, A may be O; D may be $(C_1-C_{10})$alkylene unsubstituted or substituted with halo$(C_1-C_5)$alkyl; $R^1$ to $R^4$ may be each independently halogen, $(C_1-C_{10})$alkyl, or halo$(C_1-C_{10})$alkyl; $R^5$ may be hydrogen or $(C_1-C_{10})$alkyl; $R^{12}$ and $R^{13}$ may be each independently $(C_1-C_5)$alkyl or halo$(C_1-C_5)$alkyl; $R^a$ and $R^b$ may be each independently hydrogen or $(C_1-C_5)$alkyl; and m, n, q, r, s, and t may be each independently an integer of 0 to 1.

In an exemplary embodiment of the present invention, a repeating unit represented by Formula 11-2 above may be included in an amount of 10 to 90 mol % based on the total mol % of the polyimide precursor, specifically 30 to 80 mol %, more specifically, 40 to 70 mol %, and further more specifically, 50 to 60 mol %.

In an exemplary embodiment of the present invention, a repeating unit represented by Formula 11-3 above may be included in an amount of 10 to 50 mol % based on the total mol % of the polyimide precursor, specifically, 30 to 50 mol %, and more specifically, 40 to 50 mol %.

The polyimide precursor solution according to an exemplary embodiment of the present invention may essentially include the repeating unit represented by Formula 11 above, and may further include the repeating unit represented by Formula 11-1. Specifically, the polyimide precursor solution may essentially include the repeating unit represented by Formula 11 above, and may further include the repeating unit represented by Formula 11-2 above. More specifically, the polyimide precursor solution may essentially include the repeating unit represented by Formula 11 above, and may further include the repeating unit represented by Formula 11-1 above and a repeating unit represented by Formula 12-2 above. Further more specifically, the polyimide precursor solution may essentially include the repeating unit reprewherein the substituents are defined as in claim 1, and X is halogen.

In addition, in another exemplary embodiment, a polyimide precursor composition containing a polyimide precursor and a solvent is provided.

The polyimide precursor composition according to an exemplary embodiment of the present invention contains a polyimide precursor of the present invention, such that a polyimide film having significantly improved optical and mechanical properties may be implemented.

The polyimide precursor composition according to an exemplary embodiment of the present invention may provide a polyimide film having high transparency and heat resistance, and excellent thermal dimensional stability because the stress of the substrate does not increase even with high heat treatment. In particular, a polyimide film with excellent transparency and a low coefficient of linear thermal expansion may be provided.

The polyimide precursor composition according to an exemplary embodiment of the present invention may be one or a mixture of two or more selected from ketones such as gamma-butyrolactone, 1,3-dimethyl-2-imidazolidinone, methyl ethyl ketone, cyclohexanone, cyclopentanone, and 4-hydroxy-4-methyl-2-pentanon; aromatic hydrocarbons such as toluene, xylene, and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, triethylene glycol monoethyl ether; acetates such as ethyl acetate, butyl acetate, ethylene glycol monoethyl ether acetate, ethylene glycol monobutyl ether acetate, diethylene glycol monoethyl ether acetate, and dipropylene glycol monomethyl ether acetate; alcohols such as methanol, ethanol, propanol, ethylene glycol, propylene glycol, and carbitol; and amides such as N,N-dimethylpropionamide (DMPA), N,N-diethylpropionamide (DEPA), N,N-dimethylacetamide (DMAc), N,N-diethylacetamide, N,N-dimethylformamide (DMF), N,N-diethylformamide (DEF), N-methylpyrrolidone (NMP), N-ethylpyrrolidone (NEP), and N,N-dimethyl methoxyacetamide.

For example, the organic solvent may be one or a mixture of two or more selected from the above-described amides.

For example, the organic solvent may have a boiling point of 300° C. or less. Specifically, examples of the organic solvent may include N,N-diethylformamide (DEF), N,N-diethylacetamide (DEAc), N-ethylpyrrolidone (NEP), N,N-dimethylpropion amide (DMPA), N,N-diethylpropionamide (DEPA), or combinations thereof.

The polyimide precursor composition according to an exemplary embodiment of the present invention may include 10 to 13% by weight of the polyimide precursor including the repeating unit represented by Formula 11 above, as a solid content, based on the total weight of the composition.

Specifically, the polyimide precursor composition according to an exemplary embodiment of the present invention may have a viscosity of 2,000 to 10,000 cps. The viscosity may be specifically 8,000 cps or less, and more specifically 7,000 cps or less. If the viscosity is within the above range, the efficiency of de-foaming is excellent during processing of the polyimide film, and thus an advantage in the process may be provided. Accordingly, it is desirable because a more uniform surface may be implemented. In this case, the viscosity refers to a value measured through a stabilization operation for 2 minutes at a time when a torque value is 80% by depositing the sample at room temperature (25° C.) using a Brookfield RVDV-III viscometer spindle No. 52.

The polyimide precursor solution according to an exemplary embodiment of the present invention may be prepared by polymerization of a diamine compound according to an exemplary embodiment of the present invention and an acid dianhydride in the presence of a solvent, and a molar ratio of the diamine compound according to an exemplary embodiment of the present invention and an acid dianhydride may be 2:1 to 1:2, or 1.5:1 to 1:1.5, or 1.1:1 to 1:1.1.

Polymerization of the diamine compound according to an exemplary embodiment of the present invention and an acid dianhydride may be carried out at a temperature of 70° C. or less, or 10 to 70° C., or 20 to 30° C.

In another exemplary embodiment, a polyimide film manufactured by imidation of a polyimide precursor according to an exemplary embodiment of the present invention or a polyimide precursor solution according to an exemplary embodiment of the present invention is provided.

For example, the imidation may be carried out through a chemical imidization or thermal imidization method.

For example, the imidization may be carried out through a thermal imidization method. Such a method may impart more uniform mechanical properties to the entire film when imidized by heat at a high temperature. Specifically, the polyimide film according to the present invention may be manufactured through a manufacturing method including: applying the above-described polyimide precursor solution to a substrate and then performing heat treatment.

In an exemplary embodiment of the present invention, the heat treatment may be carried out at 500° C. or less.

Specifically, the heat treatment may include, but is not limited to, a first heat treatment step performed at 100° C. or less; a second heat treatment step performed at more than 100° C. and 300° C. or less; and a third heat treatment step performed at more than 300° C. and 500° C. or less.

In an exemplary embodiment of the present invention, the substrate, without special limitation, may be a glass substrate, a metal substrate, or a plastic substrate, etc. Among these, a glass substrate that has excellent thermal and chemical stability during imidization and curing processes for the polyimide precursor solution and that may be easily separated without damage to the polyimide film formed after curing without a separate release agent treatment, may be desirable.

Specifically, in an exemplary embodiment of the present invention, the method for the application is not particularly limited, but as an example thereof, any one or more method selected from a spin coating method, an immersion method, a spray method, a die coating method, a bar coating method, a roll coating method, a meniscus coating method, a flexographic printing method, a screen printing method, a bead coating method, an air knife coating method, a reverse roll coating method, a blade coating method, a casting coating method, and a gravure coating method may be used.

In an exemplary embodiment of the present invention, after the heat treatment, a drying step and a separation step on the substrate may be further included.

In an exemplary embodiment of the present invention, the molecular weight of the polyimide precursor including the repeating unit represented by Formula 11 above is not particularly limited, but for example, if the weight average molecular weight is in the range of 20,000 to 150,000 g/mol, more excellent physical properties may be obtained.

In addition, the polyimide precursor solution according to an exemplary embodiment of the present invention may further include additives such as a leveling agent, a flame retardant, an adhesion enhancer, inorganic particles, an antioxidant, an ultraviolet inhibitor, and a plasticizer.

The present invention provides a polyimide film manufactured using the polyimide precursor composition according to the present invention, and the polyimide film according to the present invention may include a repeating unit represented by the following Formula 12:

[Formula 12]

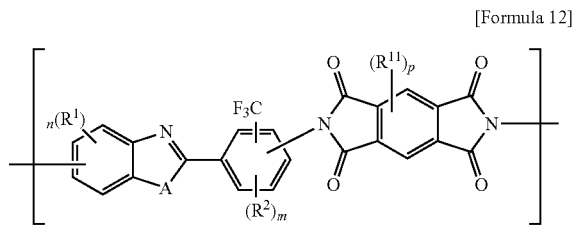

wherein

A is O or S;

$R^1$ and $R^2$ are each independently halogen, $(C_1\text{-}C_{10})$alkyl, halo$(C_1\text{-}C_{10})$alkyl, $(C_1\text{-}C_{10})$alkoxy, or $(C_6\text{-}C_{12})$ aryl;

$R^{11}$ is $(C_1\text{-}C_{10})$alkyl or halo$(C_1\text{-}C_{10})$alkyl;

m and n are each independently an integer of 0 to 2; and p is an integer of 0 to 2.

For example, in Formula 12 above, A may be O; $R^1$ and $R^2$ may be each independently halogen, $(C_1\text{-}C_{10})$alkyl, or halo$(C_1\text{-}C_{10})$alkyl; $R^{11}$ may be $(C_1\text{-}C_{10})$alkyl; m and n may be each independently an integer of 0 to 1; p may be an integer of 0 to 1, specifically, A may be O; $R^1$ and $R^2$ may be each independently halogen, $(C_1\text{-}C_5)$alkyl or halo$(C_1\text{-}C_5)$alkyl; $R^{11}$ is $(C_1\text{-}C_5)$alkyl; m and n may be each independently an integer of 0 to 1; p may be an integer of 0 to 1, and more specifically, A may be O; $R^1$ and $R^2$ may be each independently halogen, $(C_1\text{-}C_5)$alkyl or halo$(C_1\text{-}C_5)$alkyl; $R^{11}$ may be $(C_1\text{-}C_5)$alkyl; and m, n and p may be 0.

The polyimide film according to an exemplary embodiment of the present invention may further include a repeating unit represented by the following Formula 12-1:

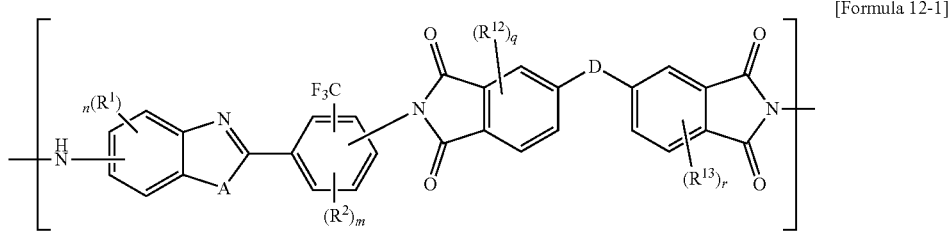

[Formula 12-1]

wherein
A is O or S;
D is $(C_1-C_{10})$alkylene unsubstituted or substituted with halo$(C_1-C_{10})$alkyl;
$R^1$ and $R^2$ are each independently halogen, $(C_1-C_{10})$alkyl, halo$(C_1-C_{10})$alkyl, $(C_1-C_{10})$alkoxy, or $(C_6-C_{12})$ aryl;
$R^{12}$ and $R^{13}$ are each independently $(C_1-C_{10})$alkyl or halo$(C_1-C_{10})$alkyl;
m and n are each independently an integer of 0 to 3; and
q and r are each independently an integer of 0 to 2.

For example, in Formula 12-1, A may be O; D may be $(C_1-C_{10})$alkylene unsubstituted or substituted with halo$(C_1-C_5)$alkyl; $R^1$ and $R^2$ may be each independently halogen, $(C_1-C_{10})$alkyl or halo$(C_1-C_{10})$alkyl; and m, n, q, r, s, and t may be each independently an integer from 0 to 1.

For example, the polyimide film according to an exemplary embodiment of the present invention may further include a repeating unit represented by the following Formula 13:

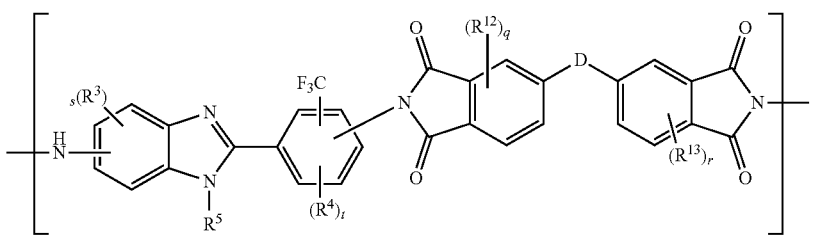

[Formula 13]

wherein
$R^3$ and $R^4$ are each independently halogen, $(C_1-C_{10})$alkyl, halo$(C_1-C_{10})$alkyl, $(C_1-C_{10})$alkoxy, or $(C_6-C_{12})$ aryl;
$R^5$ is hydrogen, halogen, $(C_1-C_{10})$alkyl, halo$(C_1-C_{10})$alkyl, $(C_1-C_{10})$alkoxy or $(C_6-C_{12})$ aryl;
$R^{11}$ is $(C_1-C_{10})$alkyl or halo$(C_1-C_{10})$alkyl;
s and t are integers of 0 to 3; and
p is an integer of 0 to 2.

According to an exemplary embodiment of the present invention, $R^3$ and $R^4$ may be each independently halogen, $(C_1-C_{10})$alkyl, or halo$(C_1-C_{10})$alkyl; $R^5$ may be hydrogen, $(C_1-C_{10})$alkyl, or halo$(C_1-C_{10})$alkyl; $R^{11}$ is $(C_1-C_{10})$alkyl or halo$(C_1-C_{10})$alkyl; s and t may be integers from 0 to 1; p may be an integer of 0 to 1, specifically, $R^3$ and $R^4$ may be each independently halogen, $(C_1-C_5)$alkyl, or halo$(C_1-C_5)$alkyl; $R^5$ may be hydrogen, $(C_1-C_5)$alkyl, or halo$(C_1-C_5)$alkyl; $R^{11}$ may be $(C_1-C_5)$alkyl or halo$(C_1-C_5)$alkyl; s and t may be integers from 0 to 1; p may be an integer of 0 to 1, and more specifically, $R^3$ and $R^4$ may be each independently halogen, $(C_1-C_{10})$alkyl, or halo$(C_1-C_{10})$alkyl; $R^5$ may be hydrogen, $(C_1-C_{10})$alkyl, or halo$(C_1-C_{10})$alkyl; $R^{11}$ may be $(C_1-C_{10})$alkyl or halo$(C_1-C_{10})$alkyl; and s, t and p may be 0.

For example, the polyimide film according to an exemplary embodiment of the present invention may further include a repeating unit represented by the following Formula 13-1:

[Formula 13-1]

wherein
D is $(C_1-C_{10})$alkylene unsubstituted or substituted with halo$(C_1-C_{10})$alkyl;
$R^3$ and $R^4$ are each independently halogen, $(C_1-C_{10})$alkyl, halo$(C_1-C_{10})$alkyl, $(C_1-C_{10})$alkoxy, or $(C_6-C_{12})$ aryl;
$R^5$ is hydrogen, $(C_1-C_{10})$alkyl, halo$(C_1-C_{10})$alkyl, $(C_1-C_{10})$alkoxy, or $(C_6-C_{12})$ aryl;
$R^{12}$ and $R^{13}$ are each independently $(C_1-C_{10})$alkyl or halo$(C_1-C_{10})$alkyl;
q and r are each independently an integer of 0 to 2; and
s and t are each independently an integer of 0 to 3.

For example, in Formula 13-1, D may be $(C_1-C_{10})$alkylene unsubstituted or substituted with halo$(C_1-C_5)$alkyl; $R^3$ and $R^4$ may be each independently, $(C_1-C_{10})$ alkyl, or halo$(C_1-C_{10})$alkyl; $R^5$ may be hydrogen or $(C_1-C_{10})$alkyl; $R^{12}$ and $R^{13}$ may be each independently $(C_1-C_5)$ alkyl or halo$(C_1-C_5)$alkyl; and q, r, s and t may independently be an integer of 0 to 1.

For example, the polyimide film according to an exemplary embodiment of the present invention essentially includes a repeating unit represented by Formula 12, and may further include the repeating unit represented by Formula 12-1, specifically, essentially includes the repeating unit represented by Formula 12, and may further include the repeating unit represented by Formula 12-1 and a repeating unit represented by Formula 13. Specifically, the polyimide film according to an exemplary embodiment of the present invention essentially includes the repeating unit represented by Formula 12, and may further include a repeating unit represented by Formula 13 and a repeating unit represented by Formula 13-1. More specifically, the polyimide film according to an exemplary embodiment of the present invention essentially includes the repeating unit represented by Formula 12, and may further include a repeating unit represented by Formula 12-1, the repeating unit represented by Formula 13, and the repeating unit represented by Formula 13-1.

The polyimide film according to an exemplary embodiment of the present invention may have a low coefficient of thermal expansion and a low yellow index, no bending or flexure, excellent transparency, and an excellent Young's modulus.

The polyimide film according to an exemplary embodiment of the present invention may have a coefficient of thermal expansion (CTE) of 20 ppm/° C. or less at 100 to 450° C., for example, 15 ppm/° C. or less, for example, 12 ppm/° C. or less, for example, 10 ppm/° C. or lower, for example 8 ppm/° C. or lower, for example 7 ppm/° C. or lower, and, for example, more than −20 ppm/° C., for example, more than −10 ppm/° C., for example, more than −5 ppm/° C., for example, more than 0 ppm/° C.

The polyimide film according to an exemplary embodiment of the present invention may have a YI of less than 25, for example 20 or less, for example 16 or less, for example 1 to 25, for example 3 to 20, for example, 3 to 16, as measured according to ASTM E313.

The polyimide film according to an exemplary embodiment of the present invention may have a Young's modulus of more than 6.0, for example, more than 6.5, for example, more than 6.0 to 8.5, for example, more than 6.5 to less than 8.0, as measured according to ASTM D882.

As an example, the polyimide film according to an exemplary embodiment of the present invention may have a coefficient of thermal expansion of 20 ppm/° C. or less at 100 to 450° C., a YI of less than 25, as measured according to ASTM E313, and a Young's modulus of more than 6.0, as measured according to ASTM D882. For example, the polyimide film may have a coefficient of thermal expansion of 15 ppm/° C. or less at 100 to 450° C., a YI of 20 or less, as measured according to ASTM E313, and a Young's modulus of more than 6.5, as measured according to ASTM D882. For example, the polyimide film may have a coefficient of thermal expansion of 12 ppm/° C. or less at 100 to 450° C., a YI of 16 or less, as measured according to ASTM E313, and a Young's modulus of 6.8 or more, as measured according to ASTM D882.

As an example, the polyimide film according to an exemplary embodiment of the present invention may have a coefficient of thermal expansion of more than 0 to 20 ppm/° C. at 100 to 450° C., a YI of 1 to less than 25, as measured according to ASTM E313, and a Young's modulus of more than 6.0 to 8.5, as measured according to ASTM D882. For example, the polyimide film may have a coefficient of thermal expansion of more than 0 to 15 ppm/° C. or less at 100 to 450° C., a YI of 3 to 20, as measured according to ASTM E313, and a Young's modulus of 6.5 to 8.5, as measured according to ASTM D882. For example, the polyimide film may have a coefficient of thermal expansion of more than 0 to 12 ppm/° C. at 100 to 450° C., a YI of 3 to 16, as measured according to ASTM E313, and a Young's modulus of more than 6.8 to less than 8.0, as measured according to ASTM D882.

The polyimide film according to an exemplary embodiment of the present invention may have a total light transmittance of 80% or more, for example, 85% or more.

The polyimide film according to an exemplary embodiment of the present invention is manufactured from the diamine compound having specific backbone and introducing $CF_3$ as a specific functional group at a specific position as described above, and thus may have excellent optical and mechanical properties.

Specifically, the polyimide film according to an exemplary embodiment of the present invention includes a repeating unit derived from the diamine compound represented by Formula 1, and thus the polyimide film having excellent optical properties, heat resistance, mechanical strength, and flexibility may be provided. Accordingly, the polyimide film according to an exemplary embodiment of the present invention may be used in various fields such as a substrate for an element, a cover substrate for a display, an optical film, an integrated circuit (IC) package, an adhesive film, a multilayer flexible printed circuit (FRC), a tape, a touch panel, and a protective film for an optical disk.

The polyimide included in the polyimide film according to an exemplary embodiment of the present invention may have a weight average molecular weight of 10,000 to 200,000 g/mol, or 20,000 to 100,000 g/mol, or 30,000 to 100,000 g/mol. In addition, the polyimide may have a molecular weight distribution (Mw/Mn) in the range of 1.1 to 2.5. If the weight average molecular weight and molecular weight distribution of the polyimide are within the above ranges, the polyimide film may have more excellent properties such as optical properties, heat resistance, mechanical strength, and flexibility.

The polyimide film according to an exemplary embodiment of the present invention may have a thickness of 5 to 15 μm.

The polyimide film according to an exemplary embodiment of the present invention may have excellent heat resistance properties according to a temperature change. Specifically, as a result obtained by measuring the thermal expansion change pattern using a TMA (TA Instruments, TMA450), when the polyimide film is subjected to a primary elevated temperature process at an elevated temperature rate of 5° C./min in a temperature range of 100° C. to 450° C. in the thickness range as described above and then cooled in a temperature range of 400° C. to 100° C. at a cooling rate of 4° C./min, 20 ppm/° C. or less may be satisfied. Specifically, the coefficient of thermal expansion (CTE) may satisfy 15 ppm/° C. or less, and more specifically, the range of −20 to 10 ppm/° C.

The polyimide film according to an exemplary embodiment of the present invention may simultaneously satisfy excellent optical properties, heat resistance, mechanical strength, and flexibility due to a rigid structure derived from the diamine compound represented by Formula 1 above. In particular, the polyimide film according to an exemplary embodiment of the present invention may exhibit excellent heat resistance against thermal shrinkage behavior that may occur during a high-temperature process, and may exhibit excellent colorless and transparent optical properties, and thus may be used in various fields such as a substrate for an element, a substrate for a display, an optical film, an integrated circuit (IC) package, an adhesive film, a multilayer flexible printed circuit (FRC), a tape, a touch panel, and a protective film for an optical disk.

The polyimide film according to an exemplary embodiment of the present invention may be used as a multilayer film in a form in which two or more layers are stacked.

In addition, the present invention provides an photoelectric element and a flexible display including the polyimide films as described above or a multilayer film including them as a flexible substrate.

The photoelectric element, for example, may include optical components, switches, and optical modulators, and is suitable for a high heat-resistance substrate requiring fine pattern formation properties at the same time.

The flexible display, for example, may include a liquid crystal display device (LCD), an organic light emitting diode (OLED), etc., and may be particularly suitable for OLED devices using a low temperature polysilicon (LTPS) process, which requires a high-temperature process, but is not limited thereto.

Hereinafter, the present invention will be described with reference to specific examples and comparative examples of the present invention. The following examples are intended to illustrate the technical idea of the present invention, and it will be apparent to those skilled in the art that the present invention is not limited to the above examples.

[Evaluation Method]

1. Coefficient of Linear Thermal Expansion (CTE) and Glass Transition Temperature (Tg)

The coefficient of linear thermal expansion was measured according to a TMA-method using a TMA (TA Instruments, Discovery 450). The size of the specimen was 5 mm×20 mm, the load was 0.02 N, and the elevated temperature rate was 5° C./min. The CTE value was measured in an elevated temperature section of a temperature range of 100° C. to 450° C.

The Tg value was measured as a point of inflection of a TMA graph in the elevated temperature section of 100° C. to 450° C.

2. Yellow Index (YI)

The yellow index was measured using a colorimeter (Hunter Associates Laboratory, Inc., ColorQuest XE), with respect to a polyimide film having a thickness of 10 μm according to ASTM E313 standard.

3. Total Light Transmittance

The total light transmittance was measured in the entire wavelength range of 380 to 780 nm using a spectrophotometer (SHIMADZU, MPC-3100) for a polyimide film having a thickness of 10 μm according to ASTM D1746 standard. The total light transmittance is represented by %.

4. Young's Modulus

The Young's modulus was measured using a UTM 3365 (Instron Corp.) under the conditions of pulling a polyimide film having a thickness of 10 μm, a length of 40 mm, and a width of 5 mm at 25° C. at 10 mm/min according to ASTM D882. The Young's modulus is represented by GPa.

5. Thickness

After coating PAA on 0.5T glass, the cured substrate was measured using a thickness meter (KLA-Tencor Corporation, Alpha step D500). The thickness is represented by μm.

6. Viscosity

The viscosity refers to a value measured by placing a sample at room temperature (25° C.) using a Brookfield RVDV-III viscometer spindle No. 52, leaving the sample for 2 minutes from the time when the torque value reaches 80%, and then stabilizing the sample. The viscosity is represented by cps.

7. Weight Average Molecular Weight

The weight average molecular weight was measured by dissolving the film in DMAc eluent containing 0.05 M LiBr. Measurement was performed using gel permeation chromatography (GPC) (Waters GPC system, Waters 1515 isocratic HPLC Pump, Waters 2414 Reflective Index detector), a column was connected to Olexis, Polypore and mixed D columns, polymethylmethacrylate (PMMA STD) was used as the standard, and the analysis was performed at 35° C. at flow rate of 1 mL/min.

[Preparation Example 1] Preparation of Diamine Compound 1

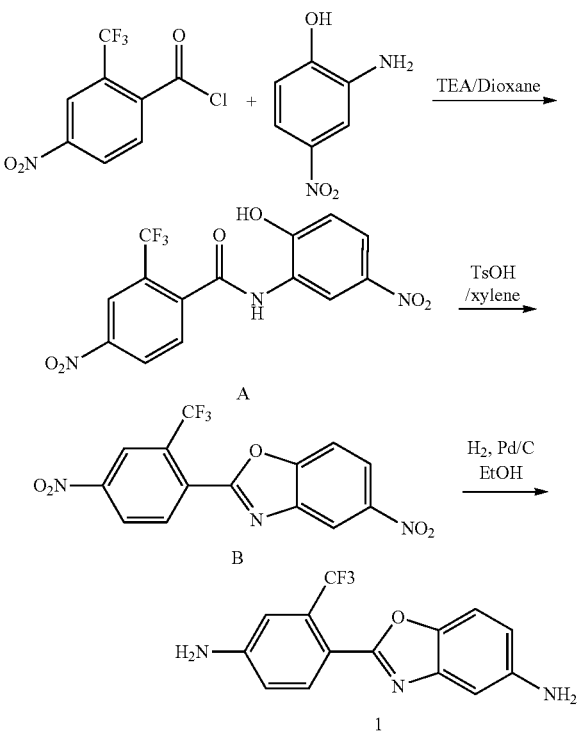

Step 1. Preparation of Compound A 4-nitro-2-trifluoromethyl benzoic acid (60 g) was added to 1 L of DCM and cooled to 0° C. under a nitrogen atmosphere. Oxalic chloride (47 g) was slowly added, and after reaction for 1 hour, 2 g of DMF was added. After stirring the mixture at room temperature for 6 hours, the solvent was removed by distillation under reduced pressure to obtain 64 g of 4-nitro-2-trifluoromethyl benzoylchloride. In a separate reactor, 39 g of 2-amino-4-nitrophenol and 7 g of TEA were dissolved in 390 mL of dioxane, and then cooled to 0° C. 64 g of the previously prepared benzoylchloride was dissolved in 250 mL of dioxane and slowly added. After elevating the temperature to room temperature and stirring for 12 hours, the solvent was removed by distillation under reduced pressure. The obtained solid was washed with 1 N HCl and filtered to obtain 72 g (yield 76%) of compound A (2-trifluoromethyl-N-(2-hydroxyl-5-nitrophenyl)-4-nitro benzamide) as a yellow solid.

Step 2: Preparation of Compound B 72 g of 4-methylbenzenesulfonic acid and 750 mL of xylene were added to 72 g of Compound A (benzamide) prepared in step 1, and refluxed for 6 hours. The solvent was removed by distillation under reduced pressure, followed by precipitation with 1:1 EtOH/H2O (1:1) to obtain 51 g of compound B (5,4'-dinitro-2'-trifluoromethyl-2-phenylbenzoxazole) (yield 74%).

Step 3: Preparation of Diamine Compound 1

Compound B obtained in step 2 was dissolved in 500 mL of EtOH, and then 5 g of 10% PdC was added thereto. After bubbling with $H_2$ and stirring the mixture for 6 hours, the catalyst was removed by filtration, and the solvent was removed by distillation under reduced pressure. Recrystallization with EtOH gave 33 g (yield 78%) of light brown diamine compound 1 (5,4'-diamino-2'-trifluoromethyl-2-phenylbenzoxazole).

$^1$H NMR (DMSO-$d_6$, 500 MHz, ppm): 7.82 (d, 1H, J=8.5 Hz), 7.33 (d, 1H, J=8.5 Hz), 7.06 (d, 1H, J=2 Hz), 6.882 (d, 1H, J=8.5 Hz), 6.82 (d, 1H, J=2 Hz), 6.63 (dd, 1H, J=8.5, 2 Hz), 6.24 (s, NH2), 5.04 (Br, NH2).

[Preparation Example 2] Preparation of Diamine Compound 2

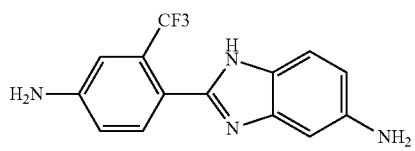 [SMILES: Nc1ccc(-c2nc3cc(N)ccc3[nH]2)c(C(F)(F)F)c1]

Diamine compound 2 was prepared as described in Polymer 49 (2008) 2644-2649.

Preparation of Polyimide Precursor Solution

Example 1

PMDA/Diamine Compound 1 (Molar Ratio 1/0.999)

184 g of N,N-dimethylpropionamide (DMPA) was placed into a stirrer through which a nitrogen stream flows, and 20.13 g of a diamine compound (compound 1) was dissolved while the temperature of the reactor was maintained at 25° C. 15.00 g of pyromellitic dianhydride (PMDA) was added to a solution of the diamine of Formula 1 at the same temperature, dissolved and stirred for a predetermined time. A polyimide precursor solution was prepared by adding DMPA so that the concentration of solid of the polyimide precursor solution prepared from the above reaction was 10.5% by weight. The polyimide precursor solution had a viscosity of 4100 cps. And as a result of measuring the molecular weight of the solution, Mw was 91000 g/mol.

Example 2

6FDA/PMDA/Compound 1/TFMB (Molar Ratio: 0.3/0.7/0.5/0.5)

203 g of N,N-dimethylpropionamide (DMPA) was placed into a stirrer through which a nitrogen stream flows, and 10.48 g of 2,2'-bis(trifluoromethyl)-4,4'-biphenyl diamine (TFMB) and 9.59 g of compound 1 were dissolved while the temperature of the reactor was maintained at 25° C. 8.72 g of 4,4'-(hexafluoroisopropylidene)diphthalic anhydride (6FDA) and 10 g of pyromellitic dianhydride (PMDA) were added to a solution of TFMB/compound 1 at the same temperature, dissolved and stirred for a predetermined time. A polyimide precursor solution was prepared by adding DMPA so that the concentration of solid of the polyimide precursor solution prepared from the above reaction was 10.4% by weight. The polyimide precursor solution had a viscosity of 4500 cps. And as a result of measuring the molecular weight of the solution, Mw was 95,000 g/mol.

Example 3

6FDA/PMDA/Compound 2/Compound 1 (Molar Ratio: 0.35/0.65/0.5/0.5)

218.5 g of N,N-dimethylpropionamide (DMPA) was placed into a stirrer through which a nitrogen stream flows, and 10.3 g of a compound 2 and 10.33 g of a compound 1 were dissolved while the temperature of the reactor was maintained at 25° C. 10.96 g of 4,4'-(hexafluoroisopropylidene)diphthalic anhydride (6FDA) and 10 g of pyromellitic dianhydride (PMDA) were added to a solution of compound 2/compound 1 at the same temperature, dissolved and stirred for a predetermined time. A polyimide precursor solution was prepared by adding DMPA so that the concentration of solid of the polyimide precursor solution prepared from the above reaction was 10.2% by weight. The polyimide precursor solution had a viscosity of 4300 cps. And as a result of measuring the molecular weight of the solution, Mw was 89,000 g/mol.

Comparative Example 1

PMDA/2,5-Diaminobenzoxazole (Molar Ratio 1/0.999)

161 g of N,N-dimethylpropionamide (DMPA) was placed into a stirrer through which a nitrogen stream flows, and 15.66 g of 2,5-diaminobenzoxazole was dissolved while the temperature of the reactor was maintained at 25° C. 15 g of pyromellitic dianhydride (PMDA) was added to the solution of 2,5-diaminobenzoxazole at the same temperature, dissolved and stirred for a predetermined time. A polyimide precursor solution was prepared by adding DMPA so that the concentration of solid of the polyimide precursor solution prepared from the above reaction was 9.3% by weight. The polyimide precursor solution had a viscosity of 4800 cps. And as a result of measuring the molecular weight of the solution, Mw was 93,000 g/mol.

Comparative Example 2

PMDA/1H-Benzimidazole-2,5-Diamine (Molar Ratio 1/0.999)

159 g of N,N-dimethylpropionamide (DMPA) was placed into a stirrer through which a nitrogen stream flows, and 15.40 g of 1H-Benzimidazole-2,5-diamine was dissolved while the temperature of the reactor was maintained at 25° C. 15 g of pyromellitic dianhydride (PMDA) was added to the solution of 1H-Benzimidazole-2,5-diamine at the same temperature, dissolved and stirred for a predetermined time. A polyimide precursor solution was prepared by adding DMPA so that the concentration of solid of the polyimide precursor solution prepared from the above reaction was 9.1% by weight. The polyimide precursor solution had a viscosity of 5100 cps. And as a result of measuring the molecular weight of the solution, Mw was 105,000 g/mol.

Comparative Example 3

PMDA/Compound 2 (Molar Ratio 1/0.999)

184.2 g of N,N-dimethylpropionamide (DMPA) was placed into a stirrer through which a nitrogen stream flows, and 20.07 g of a diamine compound (compound 2) was dissolved while the temperature of the reactor was maintained at 25° C. 15 g of pyromellitic dianhydride (PMDA) was added to the solution at the same temperature, dissolved and stirred for a predetermined time. A polyimide precursor solution was prepared by adding DMPA so that the concentration of solid of the polyimide precursor solution prepared from the above reaction was 10.4% by weight. The polyimide precursor solution had a viscosity of 4300 cps. And as a result of measuring the molecular weight of the solution, Mw was 95,000 g/mol.

Comparative Example 4

6FDA/PMDA/Compound 2/TFMB (Molar Ratio: 0.3/0.7/0.5/0.5)

203 g of N,N-dimethylpropionamide (DMPA) was placed into a stirrer through which a nitrogen stream flows, and 10.48 g of 2,2'-bis(trifluoromethyl)-4,4'-biphenyl diamine (TFMB) and 9.57 g of compound 2 were dissolved while the temperature of the reactor was maintained at 25° C. 8.72 g of 4,4'-(hexafluoroisopropylidene)diphthalic anhydride (6FDA) and 10 g of pyromellitic dianhydride (PMDA) were added to a solution of TFMB/compound 2 at the same temperature, dissolved and stirred for a predetermined time. A polyimide precursor solution was prepared by adding DMPA so that the concentration of solid of the polyimide precursor solution prepared from the above reaction was 10.6% by weight. The polyimide precursor solution had a viscosity of 4600 cps. And as a result of measuring the molecular weight of the solution, Mw was 93,000 g/mol.

Manufacture of Polyimide Film

The polyimide precursor solutions prepared in Examples 1 to 3 and Comparative Examples 1 to 4 were spin-coated on a glass substrate at a thickness of 10 μm. The glass substrate coated with the polyimide precursor solution was placed in an oven and heated at a rate of 4° C./min, and the curing process was performed by maintaining the substrate at 80° C. for 30 minutes, at 220° C. for 30 minutes, and at 450° C. for 1 hour. After completion of the curing process, the glass substrate was immersed in water to remove the film formed on the glass substrate and dried in an oven at 100° C. to manufacture a polyimide film.

The physical properties of the polyimide film manufactured by the method above were measured through the above evaluation method, and are shown in Table 1 below.

It can be confirmed from Table 1 that the polyimide films manufactured from the polyimide precursor solutions of Examples 1 to 3, including the structural unit derived from the diamine compound represented by Formula 1, have a coefficient of thermal expansion of 0 to 15 ppm/° C., a total light transmittance of 80% or more, a yellow index of less than 25, and a Young's modulus of 6.0 GPa, thereby exhibiting mechanical and optical properties suitable for application to a flexible display panel.

It can be confirmed that in particular, the polyimide film manufactured from the polyimide precursor solution of Example 3 is more advantageous for a high-temperature process of low-temperature polysilicon TFTs (LTPS TFTs) because the polyimide film has a thermal expansion coefficient of 5.7 ppm/° C., which is very close to 0, by including a combination of a structural unit derived from a diamine compound having a negative value of the coefficient of thermal expansion and a structural unit derived from a diamine compound having a positive value of the coefficient of thermal expansion.

Therefore, the polyimide precursor according to an exemplary embodiment of the present invention may manufacture a polyimide film that simultaneously satisfies optical and mechanical properties such as high heat resistance, excellent coefficient of thermal expansion, yellow index and Young's modulus.

Since the polyimide precursor according to an exemplary embodiment of the present invention uses a diamine compound having a specific structure, the polyimide film manufactured using the diamine compound has a surprisingly improved coefficient of thermal expansion, transparency, and heat resistance, and has excellent yellow index, breaking strength and Young's modulus.

Furthermore, the polyimide film manufactured using the polyimide precursor solution containing the polyimide precursor according to an exemplary embodiment of the present invention has excellent coefficient of thermal expansion and residual stress because the stress of the substrate does not increase even with high heat treatment, such that problems such as bending, peeling, and fracture do not occur.

Therefore, the polyimide film according to an exemplary embodiment of the present invention has excellent optical properties due to reduced optical anisotropy, and may implement uniform transmittance and excellent transparency.

TABLE 1

|  | Unit | Example 1 | Example 2 | Example 3 | Com. Example 1 | Com. Example 2 | Com. Example 3 | Com. Example 4 |
| --- | --- | --- | --- | --- | --- | --- | --- | --- |
| Thickness | um | 10 | 10 | 10 | 10 | 10 | 10 | 10 |
| Sol. Con. | wt % | 10.5 | 10.4 | 10.2 | 9.3 | 9.1 | 10.3 | 10.6 |
| Viscosity | cps | 4100 | 4300 | 4700 | 4500 | 5100 | 4500 | 4600 |
| Tg | ° C. | N.D. | N.D. | N.D. | N.D. | N.D. | N.D. | N.D. |
| CTE 100~450° C. | ppm/° C. | 7.5 | 11.3 | 5.7 | −11 | −9.5 | −17 | 15.5 |
| Total light transmittance (380~780 nm) | % | 85 | 88 | 87 | 87 | 76 | 85 | 88 |
| Yellow index (YI) | — | 7.5 | 12.5 | 15.3 | 25 | 42 | 23 | 11.6 |
| Young's modulus | GPa | 6.8 | 7.8 | 7.3 | 7.3 | 7.9 | 8.0 | 7.8 |

In addition, the polyimide film manufactured from the polyimide precursor solution according to an exemplary embodiment of the present invention is colorless and transparent, and has excellent heat resistance, mechanical strength, and flexibility, and thus may be very usefully used in various fields such as a substrate for an element, a substrate for a flexible display, an optical film, an integrated circuit (IC) package, an adhesive film, a multilayer flexible printed circuit (FRC), a tape, a touch panel, or a protective film for an optical disk.

Hereinabove, although the present invention has been described by specific matters, the limited embodiments, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A polyimide precursor comprising a structural unit derived from an acid dianhydride and a structural unit derived from a diamine compound represented by the following Formula 1:

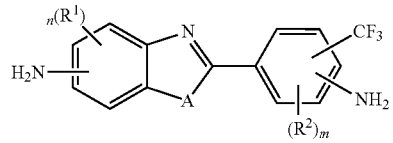

[Formula 1]

wherein
A is O or S;
$R^1$ and $R^2$ are each independently halogen, $(C_1-C_{10})$ alkyl, halo$(C_1-C_{10})$alkyl, $(C_1-C_{10})$alkoxy, or $(C_6-C_{12})$ aryl; and
m and n are each independently an integer of 0 to 3.

2. The polyimide precursor of claim 1, wherein in Formula 1,
$R^1$ and $R^2$ are each independently halogen, $(C_1-C_{10})$alkyl or halo$(C_1-C_{10})$alkyl; and
n and m are each independently an integer of 0 to 1.

3. The polyimide precursor of claim 1, wherein the Formula 1 is represented by the following Formula 2:

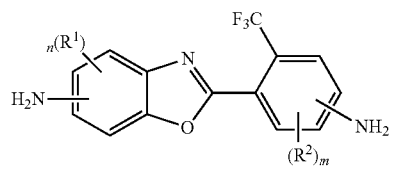

[Formula 2]

$R^1$ and $R^2$ are each independently halogen, $(C_1-C_{10})$ alkyl, halo$(C_1-C_{10})$alkyl, $(C_1-C_{10})$alkoxy, or $(C_6-C_{12})$ aryl; and
m and n are each independently an integer of 0 to 3.

4. The polyimide precursor of claim 3, wherein in Formula 2, $R^1$ and $R^2$ are each independently halogen, $(C_1-C_5)$ alkyl or halo$(C_1-C_5)$alkyl; and n and m are each independently an integer of 0 to 1.

5. The polyimide precursor of claim 1, wherein the acid dianhydride compound is represented by the following Formula 3:

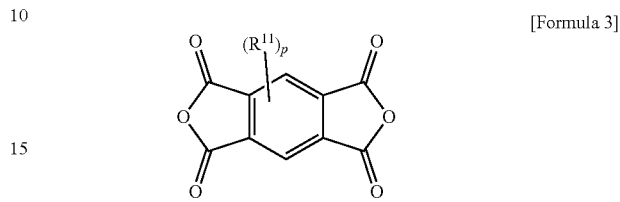

[Formula 3]

wherein
$R^{11}$ is $(C_1-C_{10})$ alkyl or halo$(C_1-C_{10})$alkyl; and
p is an integer of 0 to 2.

6. The polyimide precursor of claim 1, further comprising a structural unit derived from a diamine compound represented by the following Formula 4:

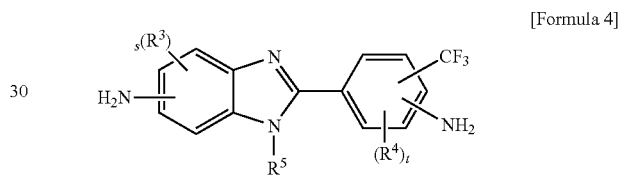

[Formula 4]

wherein
$R^3$ and $R^4$ are each independently halogen, $(C_1-C_{10})$ alkyl, halo$(C_1-C_{10})$alkyl, $(C_1-C_{10})$alkoxy, or $(C_6-C_{12})$ aryl;
$R^5$ is hydrogen, $(C_1-C_{10})$ alkyl, halo$(C_1-C_{10})$alkyl, $(C_1-C_{10})$alkoxy, or $(C_6-C_{12})$ aryl; and
s and t are integers of 0 to 3.

7. The polyimide precursor of claim 1, comprising a repeating unit represented by the following Formula 11:

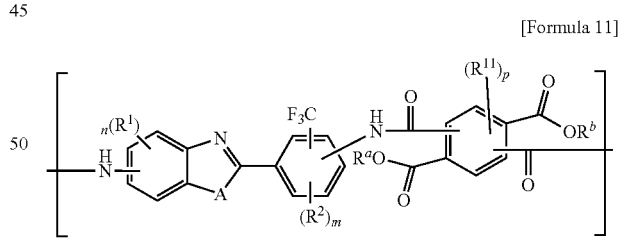

[Formula 11]

wherein
A is O or S;
$R^1$ and $R^2$ are each independently halogen, $(C_1-C_{10})$ alkyl, halo$(C_1-C_{10})$alkyl, $(C_1-C_{10})$alkoxy, or $(C_6-C_{12})$ aryl;
$R^{11}$ is $(C_1-C_{10})$ alkyl or halo$(C_1-C_{10})$alkyl;
$R^a$ and $R^b$ are each independently hydrogen or $(C_1-C_{10})$ alkyl;
m and n are each independently an integer of 0 to 3; and
p is an integer of 0 to 2.

8. The polyimide precursor of claim 7, wherein the polyimide precursor comprises 10 to 100 mol % of the repeating unit represented by Formula 11.

9. A polyimide precursor solution comprising the polyimide precursor of claim 1 and a solvent.

10. The polyimide precursor solution of claim 9, wherein the solvent is selected from amides.

11. The polyimide precursor solution of claim 10, wherein the amides are N,N-diethylacetamide, N,N-diethylformamide, N-ethylpyrrolidone, N,N-dimethylpropionamide, N,N-diethylpropionamide, or a mixture thereof.

12. A polyimide film comprising a repeating unit represented by the following Formula 12:

[Formula 12]

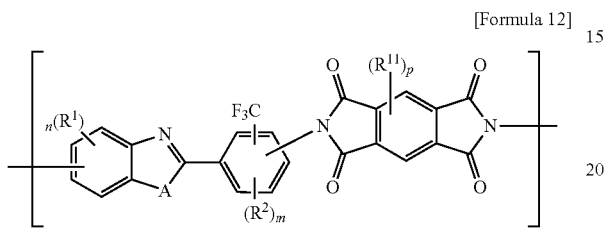

A is O or S;

$R^1$ and $R^2$ are each independently halogen, $(C_1\text{-}C_{10})$ alkyl, halo$(C_1\text{-}C_{10})$alkyl, $(C_1\text{-}C_{10})$alkoxy, or $(C_6\text{-}C_{12})$ aryl;

$R^{11}$ is $(C_1\text{-}C_{10})$ alkyl or halo$(C_1\text{-}C_{10})$alkyl;

m and n are each independently an integer of 0 to 2; and p is an integer of 0 to 2.

13. The polyimide film of claim 12, further comprising a repeating unit represented by the following Formula 13:

[Formula 13]

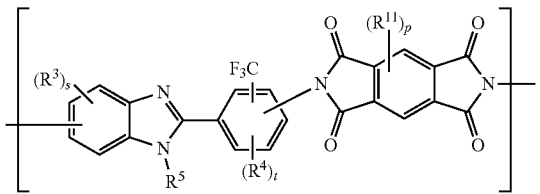

wherein $R^3$ and $R^4$ are each independently halogen, $(C_1\text{-}C_{10})$ alkyl, halo$(C_1\text{-}C_{10})$alkyl, $(C_1\text{-}C_{10})$alkoxy, or $(C_6\text{-}C_{12})$ aryl;

$R^5$ is hydrogen, $(C_1\text{-}C_{10})$ alkyl, halo$(C_1\text{-}C_{10})$alkyl, $(C_1\text{-}C_{10})$alkoxy, or $(C_6\text{-}C_{12})$ aryl;

$R^{11}$ is $(C_1\text{-}C_{10})$ alkyl or halo$(C_1\text{-}C_{10})$alkyl;

s and t are integers of 0 to 3; and p is an integer of 0 to 2.

14. The polyimide film of claim 12, wherein the polyimide film has a coefficient of thermal expansion of more than 0 to 20 ppm/° C. at 100 to 450° C.

15. The polyimide film of claim 12, wherein the polyimide film has a YI of less than 25 as measured according to ASTM E313, and a Young's modulus of more than 6.0 as measured according to ASTM D882.

16. The polyimide film of claim 12, wherein the polyimide film is used for a substrate for an element, a substrate for a display, an optical film, an integrated circuit (IC) package, an adhesive film, a multilayer flexible printed circuit (FRC), a tape, a touch panel, or a protective film for an optical disk.

17. A photoelectric element comprising the polyimide film of claim 12.

* * * * *

UNITED STATES PATENT AND TRADEMARK OFFICE
CERTIFICATE OF CORRECTION

| | |
|---|---|
| PATENT NO. | : 11,970,578 B2 |
| APPLICATION NO. | : 17/412755 |
| DATED | : April 30, 2024 |
| INVENTOR(S) | : Min Seon Jung et al. |

It is certified that error appears in the above-identified patent and that said Letters Patent is hereby corrected as shown below:

In the Claims

Column 29, Line 64, Claim 3, before "$R^1$" insert -- wherein --

Column 31, Line 25, Claim 12, before "A" insert -- wherein --

Signed and Sealed this
Twenty-fifth Day of June, 2024

Katherine Kelly Vidal
*Director of the United States Patent and Trademark Office*